Figure 1:
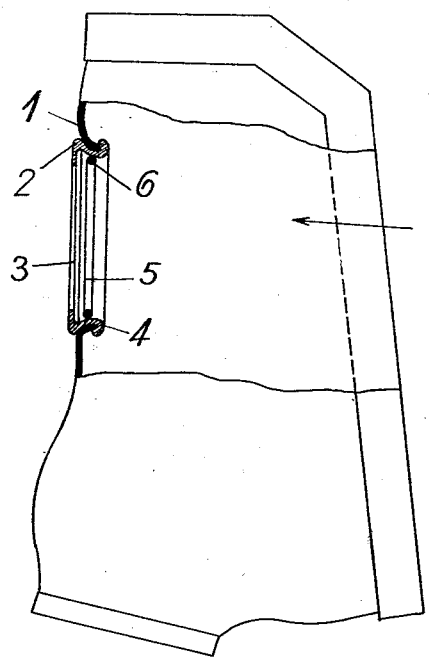

June 28, 1927.

M. MAYER ET AL

EYEGLASS

Filed Aug. 12, 1921

1,633,946

3 Sheets-Sheet 1

INVENTORS
MAX MAYER
KARL FINCKH
FRITZ KOREF

BY John Looka
ATTORNEY

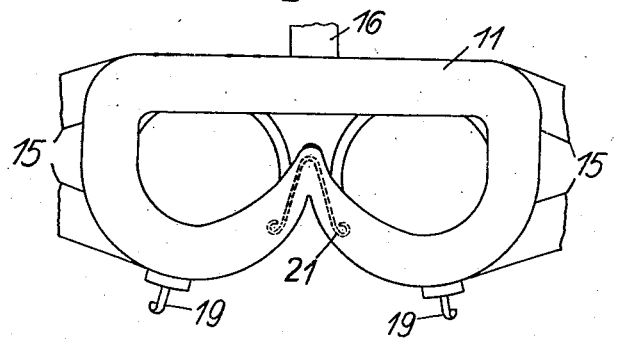
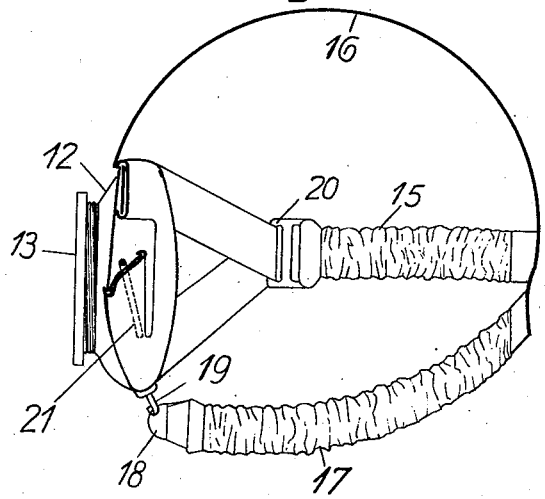
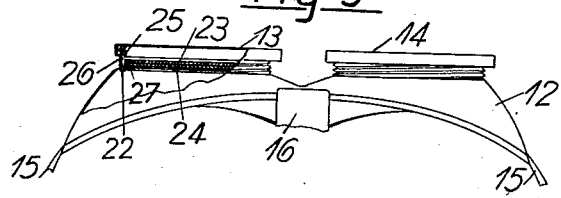

June 28, 1927.　　　　　　　　　　　　　　　　　　　1,633,946
M. MAYER ET AL
EYEGLASS
Filed Aug. 12, 1921　　　　　　3 Sheets-Sheet 3

INVENTORS
MAX MAYER
KARL FINCKH
FRITZ KOREF

BY
John Lotka
ATTORNEY.

Patented June 28, 1927.

1,633,946

UNITED STATES PATENT OFFICE.

MAX MAYER, KARL FINCKH, AND FRITZ KOREF, OF BERLIN, GERMANY, ASSIGNORS TO THE FIRM CHEMISCHE WERKE VORMALS AUERGESELLSCHAFT M. B. H. KOMMANDITGESELLSCHAFT, OF BERLIN, GERMANY.

EYEGLASS.

Application filed August 12, 1921, Serial No. 491,752, and in Germany May 23, 1916.

(GRANTED UNDER THE PROVISIONS OF THE ACT OF MARCH 3, 1921, 41 STAT. L., 1313.)

The invention relates to a device for preventing the eyeglasses of gas masks and gastight goggles or spectacles from becoming overcast or dim. A feature of the invention consists in arranging behind the eyeglasses sheets or disks of a transparent material that will absorb water, for instance viscose or gelatine, which can be easily exchanged at will, devices such as expanding rings, screw threads or the like being provided behind the gelatine disks which press them against the eyeglasses. The possibility of replacing the gelatine disks is an important factor, because layers of gelatine, after absorbing water vapor for a length of time, will swell and soften and finally even drip off, so that when the protective appliance is used again the disks do not act as desired. On the other hand the wearer of the mask is, as a rule, hardly able to spread a really serviceable layer of gelatine over the eyeglasses himself.

After the gelatine disks have been subjected for a considerable time to the exhaled moisture they will eventually also contain moisture at the side adjacent to the eyeglass and exude this moisture into the narrow space between the gelatine disk and the eyeglass. The result of this is that the overcasting of the eyeglass, although delayed, does finally take place. For this reason special arrangements, which form another feature of the invention, are provided in conjunction with the gelatine disks. To prevent the water vapor from penetrating to the eyeglass, an intermediate sheet of transparent material that is impervious, or practically impervious, to water, is placed between the eyeglass and the gelatine disk. The said material may be a film of transparent, water-repellent material, such as celluloid or the like. The impervious film may also be united with the gelatine disk so as to form a single composite disk. The same effect is obtained by spreading a coating of impervious varnish over the gelatine disk. To decrease the mechanical weakness of the gelatine layer a suitable degree of hardness may be imparted to it.

The effect of gelatine may be considered as equal to that of viscose. Hence satisfactory results may also be obtained with disks of viscose and intermediate layers of suitable impervious material interposed between them and the glasses, or with such disks consisting of combined layers of viscose and water-proof material.

Figure 2:
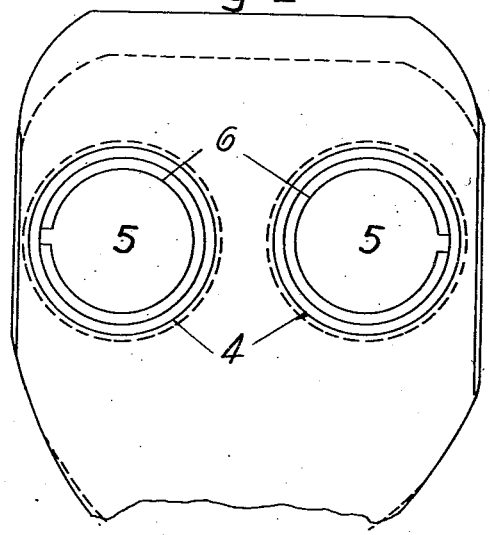

Some constructional forms of the invention are illustrated in the drawing in which Fig. 1 shows a gas-mask, partly in section, with a replaceable gelatine disk, Fig. 2 is a view of Fig. 1 looking in the direction of the arrow, Figs. 3 to 5 represent a gas-tight pair of spectacles in which replaceable gelatine disks are arranged behind the eyeglasses, Fig. 3 being a rear view of the spectacles, Fig. 4 a side view partly in section, and Fig. 5 a top view, partly in section.

Figure 6:
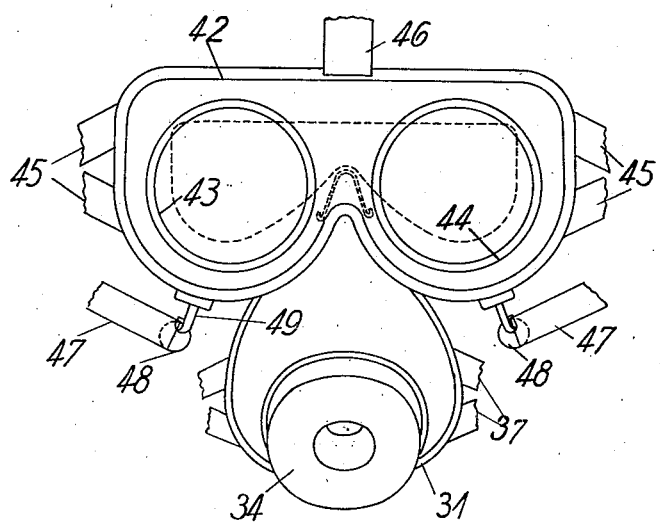
Figure 7:
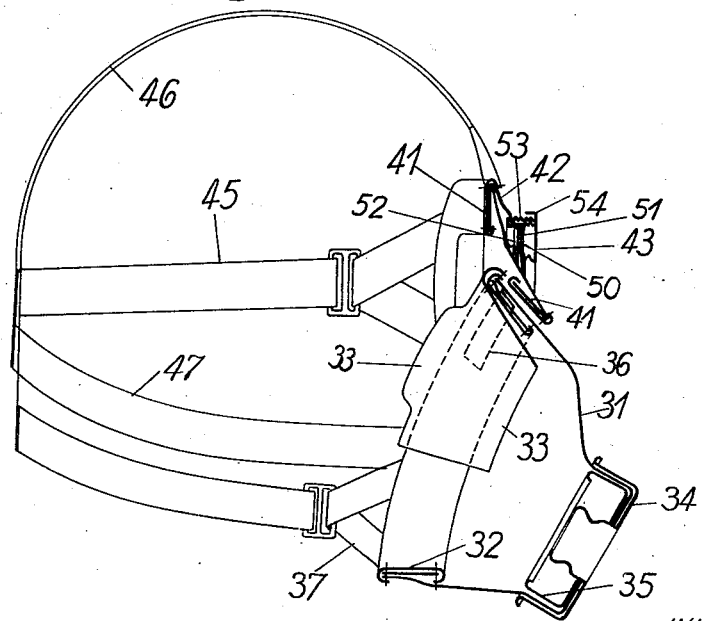

Figs. 6 and 7 are a front and sectional view respectively of a modified gas-mask according to the invention.

In the gas-mask shown in Figs. 1 and 2 the eyeglass 3 is lodged in the glass mounting 2 arranged in the bag or body 1 of the mask. The turned-over edges of the mounting 2 engage the edges of the glass and mask so as to form gas-tight joints. The mounting 2 tapers inwards and its tapering portion 4 contains the gelatine or equivalent disk 5 placed adjacent to the glass and an open, elastic ring 6 that presses the disk 5 against the inner surface of the glass. The disk 5 may consist entirely of celluloid or like water-repellent material coated with gelatine; or a gelatine disk covered with varnish at the side next to the eyeglass may be used. The disks 5, instead of being made of gelatine, may consist of viscose.

Figs. 3, 4 and 5 illustrate the use of replaceable disks of gelatine or viscose in accordance with the invention in gas-tight spectacles. These figures also illustrate a novel and peculiar construction of the spectacles themselves by which a gas-tight joint is obtained between the spectacle and the face, especially in the angles of the nose. This object of the invention is accomplished by mounting the spectacles upon a special closely fitting frame which is pressed against the face by suitable head bands. At the part which extends over the nose a spring bow is preferably provided, which presses the frame against the nose.

As shown in Figs. 3 to 5 the spectacles 12, consisting of gas-tight stuff or leather, are mounted on a rather broad frame 11 of leather. Inserted in the spectacles 12 are the mountings 13 and 14 for the eyeglasses. The frame 11 and spectacles 12 may be united by stitches at their edges. Headbands 15 and 16 which pass over the temples and forehead respectively of the wearer extend from the frame 11. At the end of the headband 16 located at the back of the head two other holding bands 17 are fixed whose free ends are furnished with eyes 18 which are slipped onto hooks 19 fixed to the frame 11 beneath the eyeglass mountings 13 and 14. The holding bands 17 and headbands 15, 16 may be made elastic, as by inserting springs in them. The headband 15 terminates in an eye 20 which operates to distribute the forces evenly between the two bands attached to the spectacles. Inserted in the part of the frame 11 that extends over the nose is a spring bow 21 consisting of a steel wire bent to conform to the shape of the nose. The eyeglass mountings 13 and 14 are fixed in the spectacles by their turned-over edges 22 clamping or gripping the fabric of which the body of the spectacles consists. The device for securing the gelatine disks 24 and the eyeglass 23 consists of a threaded member 25 screwed from without into a female thread 26. To ensure that the joint shall be perfectly gastight a rubber gasket 27 is preferably inserted.

Figs. 6 and 7 show another form of mask in which the disks of gelatine or viscose are arranged to prevent overcasting of the eyeglasses. In accordance with the invention the appliance shown in these figures consists of a mask that covers the mouth and nose, and of protective spectacles superimposed upon and effectively closing the mask. The mask 31 of leather or other gastight material is provided with a sealing frame, i. e. a frame 32 adapted to press the mask tightly against the face and to ensure a gastight fit. This frame 32 extends over the bridge of the nose, the adjacent parts of the cheeks, and the chin. If necessary an auxiliary frame 33 may be superimposed upon the frame 32. The mouthplate 34 into which a breath filter, or a tube leading to the breath filter, is inserted, is fixed to the mask 31 by means of an adapting ring 35 between which and the mouthpiece 34 the leather of the mask is firmly clamped. A spring bow 36 may be inserted in the nose portion of the sealing frame. The mask 31 is pressed against the face by holding bands 37 which pass round the head.

Set on the mask 31 is the protecting goggle or spectacle 42 which may consist of leather or the like and which is mounted upon a sealing frame 41 of leather or the like extending over the forehead, temples, and bridge of the nose, and comprising the eyeglass mountings 43 and 44. In other respects the spectacles are constructed like those shown in Figs. 3 to 5. Lying against the eyeglasses 50 are the disk 51 of celluloid or other waterproof transparent material, and next to these are the disks 52 of transparent water-absorbing material such as gelatine or viscose. The mountings 43, 44 consist of a male-threaded member 54 and a female-threaded member 53, so that the disks 50, 51, 52 may be held in position by screwing the parts 54, 53 together, or replaced after the said parts are unscrewed. The spectacle portion 41, 42 is held on the head by the band 45 and 46. Attached to the rear end of the band 46 are two other bands 47—preferably elastic—whose free ends are furnished with eyes 48 which are slipped onto hooks 49 attached to the frame 41 beneath the eyeglass mountings 43 and 44. On the nose and at the adjacent portion of the cheeks the sealing frame 41 of the protecting spectacles 42 presses upon the frame 32 of the mask 31 and forms a tight joint upon the same.

Although selected specific forms of the invention are illustrated and described herein, it will be obvious that many changes may be made without departing from the spirit and scope of the invention reflected in the following claims.

We claim:—

1. Eyeglasses, replaceable sheets of overcasting-proof substance behind the eyeglasses, means for pressing the said sheets toward the eyeglasses, and waterproof transparent layers between the said sheets and the eyeglasses.

2. Eyeglasses, replaceable sheets of overcasting-proof substance behind the eyeglasses, means for pressing the said sheets against the eye-glasses, and separate intermediate sheets of transparent water repellent material between the overcasting-proof sheets and the eyeglasses.

3. Eyeglasses, replaceable sheets of overcasting-proof substance behind the eyeglasses, means for pressing the said sheets toward the eyeglasses, and separate intermediate sheets of celluloid between the overcasting-proof sheets and the eyeglasses.

4. Eyeglasses, replaceable sheets of transparent water-absorbing material behind the eyeglasses, means for pressing the said sheets toward the eyeglasses, and waterproof transparent layers between the said sheets and the eyeglasses.

5. Eyeglasses, replaceable sheets of transparent water-absorbing material behind the eyeglasses, means for pressing the said sheets toward the eyeglasses, and separate intermediate sheets of waterproof transparent material between the said water-absorbing sheets and the eyeglasses.

6. Eyeglasses, replaceable sheets of transparent water-absorbing material behind the eyeglasses, means for pressing the said sheets toward the eyeglasses, and separate intermediate sheets of celluloid between the said water-absorbing sheets and the eyeglasses.

7. An eyeglass having a protecting layer of transparent water-absorbing material and a layer of transparent water-repellent material between the eyeglass and the first-named layer.

In testimony whereof we have signed this specification.

Dr. MAX MAYER.
Dr. KARL FINCKH.
Dr. FRITZ KOREF.